United States Patent [19]

Utoh et al.

[11] Patent Number: 4,741,033
[45] Date of Patent: Apr. 26, 1988

[54] TELEPHONE SERVING AS BOTH TABLE MOUNTED TYPE AND WALL HUNG TYPE

[75] Inventors: Yoshihiro Utoh; Shinichi Shibata, both of Hino, Japan

[73] Assignee: Kabushiki Kaisha Toshiba, Kawasaki, Japan

[21] Appl. No.: 709,762

[22] Filed: Mar. 8, 1985

[30] Foreign Application Priority Data

Apr. 27, 1984 [JP] Japan .............. 59-62444[U]

[51] Int. Cl.⁴ .................. H04M 1/04; H04M 1/15
[52] U.S. Cl. ...................... 379/435; 379/419; 379/438; 379/442; 379/450; 379/454
[58] Field of Search .......... 179/100 C, 100 R, 100 D, 179/101, 178, 179; 379/435, 437, 436, 438, 442, 454, 419, 450

[56] References Cited

U.S. PATENT DOCUMENTS

| | | | |
|---|---|---|---|
| 1,247,672 | 11/1977 | Hallberg | 379/454 |
| 2,572,478 | 10/1951 | Hawkins | 379/441 |
| 3,546,396 | 12/1970 | Marcheschi et al. | 379/369 |
| 3,953,688 | 4/1976 | Rocha | 379/450 |
| 4,056,696 | 12/1977 | Meyerle et al. | 379/419 |
| 4,169,218 | 9/1979 | Tyler | 379/434 |

FOREIGN PATENT DOCUMENTS

| | | | |
|---|---|---|---|
| 2918704 | 11/1980 | Fed. Rep. of Germany | 179/103 |
| 56-93463 | 7/1981 | Japan | 179/100 D |
| 60-174554 | 9/1985 | Japan | 379/435 |
| 61-57155 | 3/1986 | Japan | 379/438 |
| 2143703 | 2/1985 | United Kingdom | |

Primary Examiner—Jin F. Ng
Assistant Examiner—Danita R. Byrd
Attorney, Agent, or Firm—Finnegan, Henderson, Farabow, Garrett & Dunner

[57] ABSTRACT

In a telephone usable as both table mounted type and wall hung type by selectively changing the direction of attaching of a holding board of which upper side extends at a certain inclination angle relative to the bottom thereof, a casing of the telephone is detachably fitted onto the holding board. The holding board includes receiving means for receiving telephone cable in the form of a bundle and it is formed with an inlet hole through which the cable is introduced into the holding board and an outlet hole through which it is taken from the same. As required, an excessive part of the cable is received in the holding board and thereby an usable length of cable can be reduced remarkably.

11 Claims, 3 Drawing Sheets

TELEPHONE SERVING AS BOTH TABLE MOUNTED TYPE AND WALL HUNG TYPE

BACKGROUND OF THE INVENTION

1. Field of the Invention

The present invention relates to a telephone serving as both table mounted type and wall hung type and more particularly to a telephone of the above-mentioned type including an excellent structure for receiving a line telephone cable therein.

2. Description of the Prior Art

A typical conventional telephone usable as both table mounted type and wall hung type will be described below with reference to FIGS. 1 and 2. When it is used as table mounted type, it is constructed such that a casing 1 is detachably mounted on a box-shaped holding board 2 in such a manner that its fore end part (right end part in FIG. 1) is raised up above the table surface, as illustrated in FIG. 1. As is best seen from FIG. 3, one side (hereinafter called the upper side) of the holding board 2 is opened. On the other hand, when it is used as wall hung type, the casing 1 is mounted on the holding board 2 in such a manner that its rear end part (left end part as seen in FIG. 1) assumes the lower position spaced away from the wall surface, as illustrated in FIG. 2. The holding board 2 of which upper side extends at a certain inclination angle relative to the bottom thereof is molded of synthetic resin in the same manner as the upper and lower covers 1a and 1b of the casing 1. As illustrated in FIG. 3, the holding board 2 is formed with a pair of pawls 3 on the upper end of the rear side wall 2a, a pair of engagement pieces 4 on the upper end of the fore side wall 2b and three fitting holes 2d on the bottom wall 2c thereof. When the telephone is mounted on a wall 6 as wall hung type, the holding board 2 is first fixed to the wall 6 by means of set screws 5 threadably fitted through the holes 2d and the casing 1 is then firmly fitted onto the holding board 2 by engaging the pawls 3 and the engagement pieces 4 to corresponding holes 7 and 8 on the lower cover 1b.

When the telephone is used as table mounted type as illustrated in FIG. 1, it is often found that the casing 1 is placed at the position remote from a modular jack which is not shown in the drawing, for instance, on the table surface or the like. On the other hand, when it is used as wall hung type as illustrated in FIG. 2, it is often found that the casing 1 is placed at the position in the vicinity of the modular jack 9. In the last-mentioned case it generally requires a short length of telephone cable 10. However, if a telephone having telephone cable 10 of which length is determined for the purpose of table mounted type is employed as wall hung type for any reason, there is necessity for cutting off an excessive part of the cable 10 and attaching a new modular plug 11 to the foremost end of the shortened cable. Otherwise, there is necessity for replacing the cable initially provided with another shorter one. However, replacing operation is usually complicated and takes long time.

Further, when a telephone which has been once mounted as wall hung type, that is, a telephone having short telephone cable 10 is to be in use as table mounted type, there is necessity for replacing the initially provided cable 10 with another longer one. Particularly, when an user performs replacing operation by himself, he is required to start it with the step of getting a longer cable. However, this is very complicated and takes long time.

SUMMARY OF THE INVENTION

Hence, the present invention has been made with the foregoing background in mind.

The present invention consists in a telephone serving as both table mounted and wall hung types which includes a holding board of which upper side extends at a certain inclination angle relative to the bottom thereof, the holding board being used for the telephone of both table mounted type and wall hung type by selectively changing the direction of mounting thereof, receiving means disposed in the holding board to receive a line of telephone cable, an inlet hole through which the cable is introduced into the holding board from the casing and an outlet hole through which the cable is extended to the outside from the holding board whereby an extra part of the cable is received in the form of a bundle in the receiving means of the holding board when the telephone is to be in used with the cable being reduced in length.

OBJECT OF THE INVENTION

It is an object of the present invention to provide a telephone serving as both table mounted type and wall hung type which assures that the length of telephone cable is adjusted as required.

It is other object of the present invention to provide a telephone serving as both table mounted type and wall hung type which assures that there is no occurrence of exposure of any part of telephone cable to the outside when it it is in use as wall hung type.

It is another object of the present invention to provide a telephone serving as both table mounted type and wall hung type which assures that any length of telephone cable is easy to be handled.

It is still another object of the present invention to provide a telephone serving as both table mounted type and wall hung type which assures that an excessive part of telephone cable is easy to be stored and reused as required.

Other objects, features and advantages of the present invention will become more clearly apparent from reading of the following description which has been prepared in conjunction with the accompanying drawings.

BRIEF DESCRIPTION OF THE DRAWINGS

The accompanying drawings will be briefly described below.

DESCRIPTION OF THE PREFERRED EMBODIMENT

Now, the present invention will be described in a greater detail hereunder with reference to FIGS. 4 to 7 which illustrate a preferred embodiment thereof.

Figure 1:
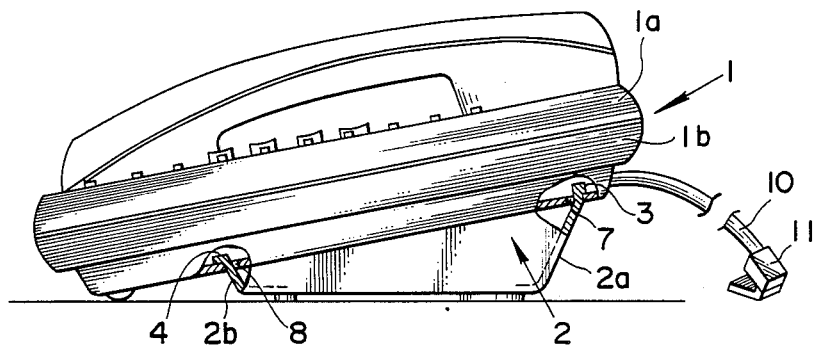
FIG. 1 is a partially sectioned side view of a conventional telephone usable as both table mounted type and wall hung type, wherein it is in use as table mounted type.
Figure 2:
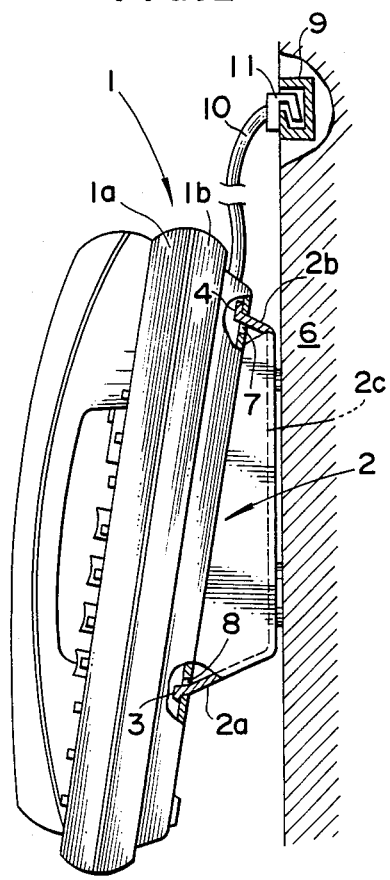
FIG. 2 is a partially sectioned side view of the conventional telephone in FIG. 1, wherein it is in use as wall hung type.
Figure 3:
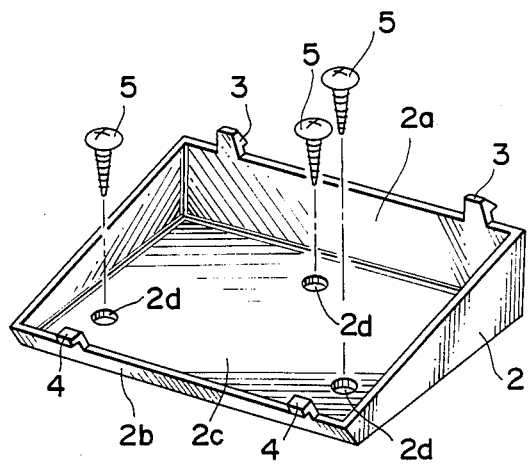
FIG. 3 is a perspective view of a holding board for the conventional telephone in FIGS. 1 and 2.
Figure 4:
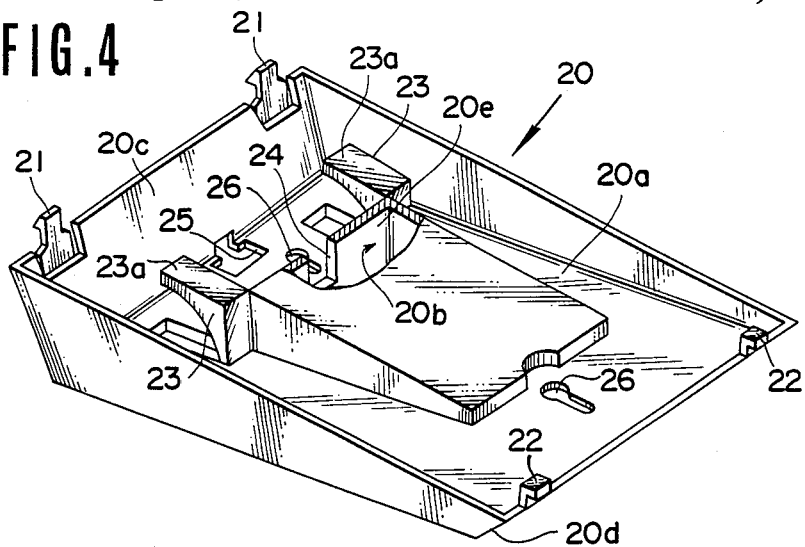
FIG. 4 is a perspective view of a holding board usable for a telephone serving as both table mounted type and wall hung type according to the present invention.
Figure 5:
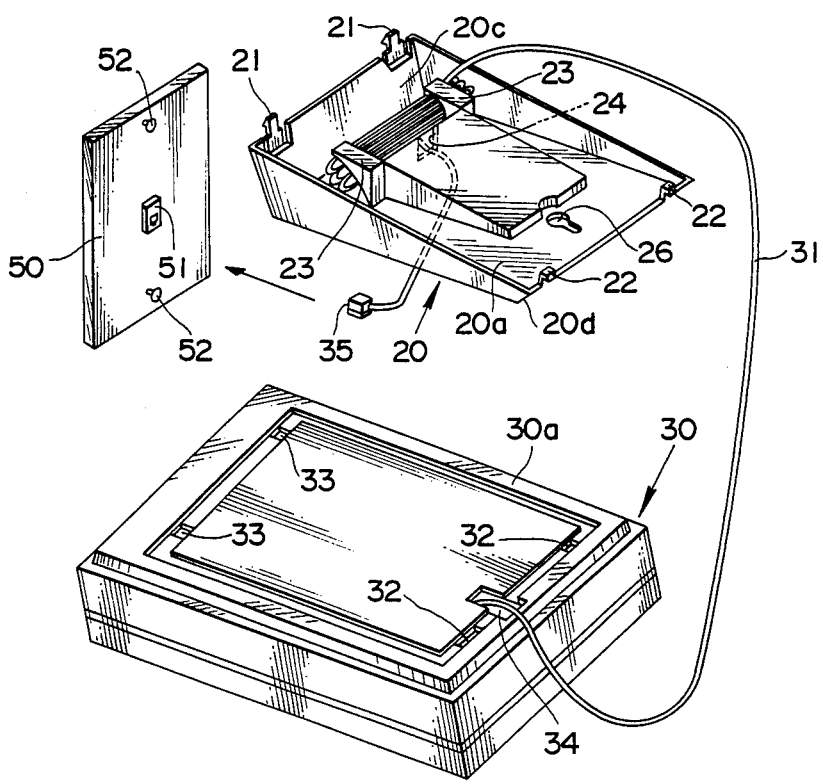
FIG. 5 is a perspective view of essential components constituting the telephone of the invention, shown in the disassembled state.

Referring first to FIG. 4, a holding board 20 of which the upper open end extends at a certain inclination angle relative to the bottom thereof is designed in the box-shaped configuration with its upper open end adapted to be fitted to a telephone casing 30 (FIG. 5). The holding board 20 is formed with a raised portion 20b which is opened outwardly as seen from below in the drawing. Further, the holding board 20 is formed with a pair of engagement pawls 21 on the upper end of the one side wall 20c and a pair of engagement pieces 22 on the upper end of the other side wall 20d. Both the engagement pawls 21 and pieces 22 serve as engagement means for allowing the casing 30 to be engaged to the holding board 20. The one side wall 20e constituting the raised portion 20b on the bottom wall 20a of the holding board 20 has a pair of substantially L-shaped tongues 23 projected outwardly of both the ends thereof so that the free ends 23a of the tongues 23 are located substantially flush with the open end face of the holding board 20 to which the lower surface 30a of the casing 30 is to be firmly engaged. It should be noted that the free end parts of the tongues 23 are extended to the position located close to the side wall 20c. On the one side wall 20e of the raised portion 20b and in the boundary area between the bottom wall 20a and the side wall 20c are formed outlet holes 24 and 25 through which a telephone cable 31 is extended. Further, on the bottom wall 20a are formed key hole-shaped slots 26 which constitute a part of securing means for fixedly securing the holding board 20 to a wall 40 (FIG. 6).

On the other hand, the casing 30 is formed with four rectangular holes 32 and 33 on the lower surface 30a which serve as other part of engaging means for firmly engaging the casing 30 to the holding board 20 as illustrated in FIG. 5. When the casing 30 is mounted on the holding board 20, the engagement pawls 21 and the engagement pieces 22 on the latter are fitted into the rectangular holes 32 and 33 on the former. Further, the casing 30 is formed with a rectangular hole 34 on the lower surface 30a through which the cable 31 is extended outwardly. As is apparent from FIG. 7, the outlet hole 34 is extended across the end face of the side wall 20c on the holding board 20 when the casing 30 is firmly mounted on the holding board 20. Namely, one half of the outlet hole 34 is opened outside the holding board 20 and the other half of the same is opened inside the latter.

Next, operation of the telephone of the invention will be described below.

Figure 6:
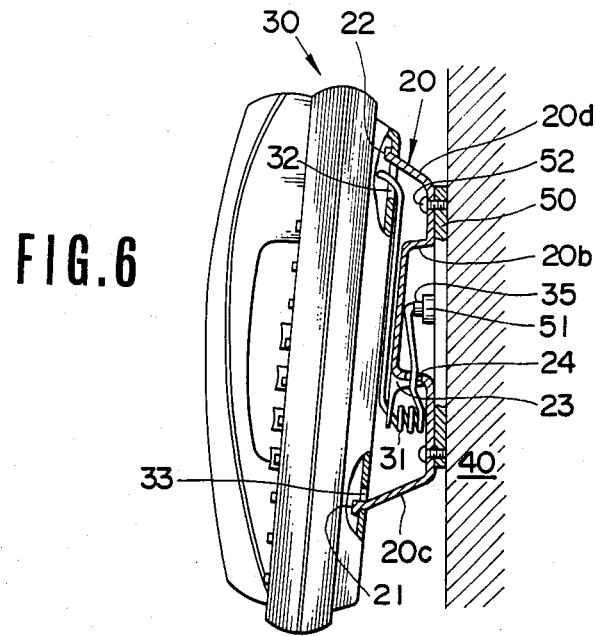
FIG. 6 is a partially sectioned side view of the telephone of the invention, wherein it is in use as wall hung type.

Description will be first made as to the case where it is used as a wall hung type telephone, as illustrated in FIG. 6. A modular plug 35 at the one end of the cable 31 is taken out of the holding board 20 through the outlet hole 24 and it is then plugged in a modular jack 51 on a plate 50 which is previously fixed to the wall 40. Next, the key hole-shaped slots 26 on the holding board 20 are engaged onto the engagement pins 52 on the plate 50 whereby the holding board 20 is fixedly mounted on the wall 40. At this moment the modular jack 51 and the modular plugs are fully housed in the cavity of the raised portion 20b of the holding board 20. The residual part of the cable 31 is folded in the form of a bundle and the latter is then received in the space as defined by the substantially L-shaped tongues 23, the bottom wall 20a and the side walls 20c and 20e. Then, the casing 30 is firmly mounted on the holding board 20 by engaging the engagement pawls 21 and the engagement pieces 22 on the latter to the engagement holes 32 and 33 on the former, as illustrated in FIG. 6. It should be noted that in the illustrated embodiment an opening formed on the one side wall of raised portion 23 is used as an outlet hole through which the cable 31 is to be extended from the holding board 20.

When the telephone of the invention is firmly hung on the wall 40 in that way, there is no occurrence of exposure of any part of the cable 31 to the outside and therefore esthetic appearance of the telephone is not degraded any longer. The bundled part of the cable 31 is easy to be received in the holding board 20 and taken therefrom as required.

Figure 7:
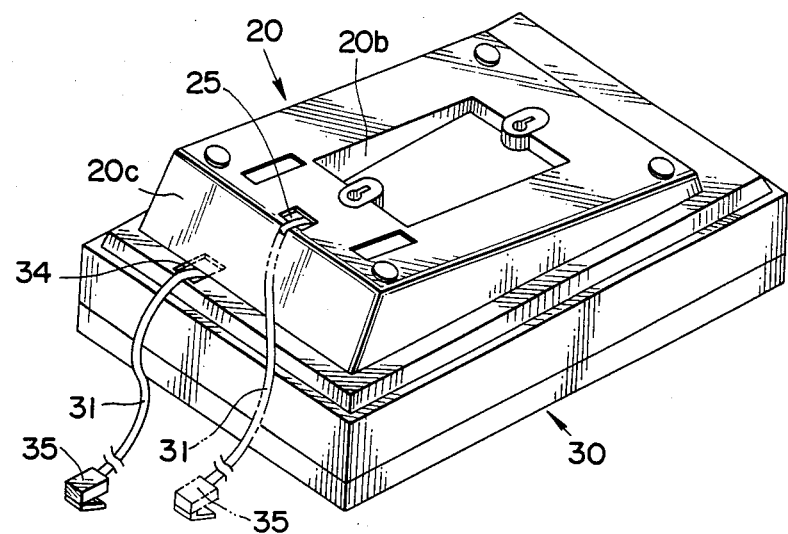
FIG. 7 is a perspective view of the telephone of the invention shown in the upset state, particularly illustrating how telephone cable is introduced into the holding board and taken out of the same.

In case where the telephone of the invention is used as a table mounted type telephone, the cable 31 is not received in the holding board 20 but it is extended outwardly through the outlet hole 34 on the lower surface 30a of the casing 30, as illustrated by real lines in FIG. 7. Alternatively, it may be extended outwardly through the outlet hole 25 on the holding board 20 after it is once introduced into the latter, as illustrated by phantom lines in FIG. 7.

While the present invention has been described above with respect to a single preferred embodiment, it should be of course be understood that it should not be limited only to this but various changes or modifications may be made in any acceptable manner without departure from the spirit and scope of the invention as defined by the appended claims.

What is claimed is:

1. A telephone serving as both a table mounted type and a wall hung type, comprising:

a casing having a bottom portion and a telephone cable extending therefrom;

a holding board having a bottom face with an outlet hole therein and a pair of side faces, said bottom face having an inward side facing in an inward direction toward said bottom portion of said casing and an outward side facing in an outward direction away from said bottom portion of said casing, said side faces extending inwardly from opposite ends of said bottom face toward said bottom portion of said casing, each of said side faces having a top edge abuttable against said bottom portion of said casing, said bottom face including a raised portion projecting inwardly from said inward side toward said casing and defining a cavity on said outward side, said telephone cable being extendable from said bottom portion of said casing and through said outlet hole to said outward side of said bottom face of said holding board;

engaging means for detachably engaging said said faces of said holding board with said bottom portion of said casing;

fixing means for mounting said bottom face of said holding board on a vertical surface; and receiving means for receiving an excessive part of said telephone cable between said holding board and said bottom portion of said casing.

2. A telephone as claimed in claim 1, wherein said raised portion includes a side wall extending inwardly from said bottom face of said holding board and defining a perimeter surface of said cavity, said side wall of said raised portion including said outlet hole.

3. A telephone as claimed in claim 1, wherein said bottom portion of said casing includes a second outlet hole disposed and configured to extend on opposite sides of one of said side faces of said holding board at times when said side faces of said holding board are engaged with said bottom portion of said casing, said telephone cable extending from said casing through said second outlet hole.

4. A telephone as claimed in claim 1, wherein said receiving means includes a pair of L-shaped tongues each having a first leg attached to and extending inwardly from said bottom face of said holding board and a second leg extending from said first leg and being spaced from said bottom face of said holding board.

5. A telephone as claimed in claim 2, wherein said receiving means includes a pair of L-shaped tongues each having a first leg attached to and extending inwardly from said bottom face of said holding board adjacent said side wall of said raised portion and a second leg extending from said first leg and being spaced from said bottom face of said holding board.

6. A telephone serving as both a table mounted type and a wall hung type, comprising:
  a casing having a bottom portion and a telephone cable extending therefrom;
  a holding board having a bottom face with an outlet hole therein and a pair of side faces, said bottom face having an inward side facing in an inward direction toward said bottom portion of said casing and an outward side facing in an outward direction away from said bottom portion of said casing, said side faces extending inwardly from opposite ends of said bottom face toward said bottom portion of said casing, each of said side faces having a top edge abuttable against said bottom portion of said casing, said top edges defining an imaginary plane non-parallel to said bottom face, said bottom face including a raised portion projecting inwardly from said inward side toward said casing and defining a cavity on said outward side, said telephone cable being extendable from said bottom portion of said casing and through said outlet hole to said outward side of said bottom face of said holding board;
  engaging means for detachably engaging said side faces of said holding board with said bottom portion of said casing in a first position at times when said telephone is used as a table mounted type and in a second position at times when said telephone is used as a wall hung type, said holding board is said second position being rotated 180 degrees from said first position of said holding board;
  fixing means for mounting said bottom face of said holding board on a vertical surface at times when said telephone is used as wall hung type; and
  receiving means for receiving an excessive part of said telephone cable between said holding board and said bottom portion of said casing.

7. A telephone as claimed in claim 6, wherein said raised portion includes a side wall extending inwardly from said bottom face of said holding board and defining a perimeter surface of said cavity, said side wall of said raised portion including said outlet hole.

8. A telephone cable is claimed in claim 6, wherein said bottom portion of said casing includes a second outlet hole disposed and configured to extend on opposite sides of one of said side faces of said holding board at times when said side faces of said holding board are engaged with said bottom portion of said casing, said telephone cable extending from said casing through said second outlet hole.

9. A telephone as claimed in claim 6, wherein said receiving means includes a pair of L-shaped tongues each having a first leg attached to and extending inwardly from said bottom face of said holding board and a second leg extending from said first leg and being spaced from said bottom face of said holding board.

10. A telephone as claimed in claim 7, wherein said receiving means includes a pair of L-shaped tongues each having a first leg attached to and extending inwardly from said bottom face of said holding board adjacent said side wall of said raised portion and a second leg extending from said first leg and being spaced from said bottom face of said holding board.

11. A telephone serving as both a table mounted type and a wall hung type, comprising:
  a casing having a bottom portion and a telephone cable extending therefrom;
  a holding board having a bottom face with an outlet hole therein and a pair of side faces, said bottom face having an inward side facing in an inward direction toward said bottom portion of said casing and an outward side facing in an outward direction away from said bottom portion of said casing, said side faces extending inwardly from opposite ends of said bottom face toward said bottom portion of said casing, each of said side faces having a top edge abuttable against said bottom portion of said casing, said top edges defining an imaginary plane non-parallel to said bottom face, said telephone cable being extendable from said bottom portion of said casing and through said outlet hole to said outward side of said bottom face of said holding board;
  engaging means for detachably engaging said side faces of said holding board with said bottom portion of said casing in a first position at times when said telephone is used as a table mounted type and in a second position at times when said telephone is used as a wall hung type, said holding board in said second position being rotated 180 degrees from said first position of said holding board;
  fixing means for mounting said bottom face of said holding board on a vertical surface at times when said telephone is used as wall hung type; and
  receiving means for receiving an excessive part of said telephone cable between said holding board and said bottom portion of said casing, including a pair of L-shaped tongues each having a first leg attached to and extending inwardly from said bottom face of said holding board and a second leg extending from said first leg and being spaced from said bottom face of said holding board said excessive part being folded in the form of a bundle.

* * * * *